Sept. 6, 1960

E. A. HECKMAN ET AL 2,951,932

WELDING APPARATUS

Filed July 21, 1958

INVENTORS
E. A. HECKMAN
R. C. SHAFER

By W. A. Johnson
ATTORNEY

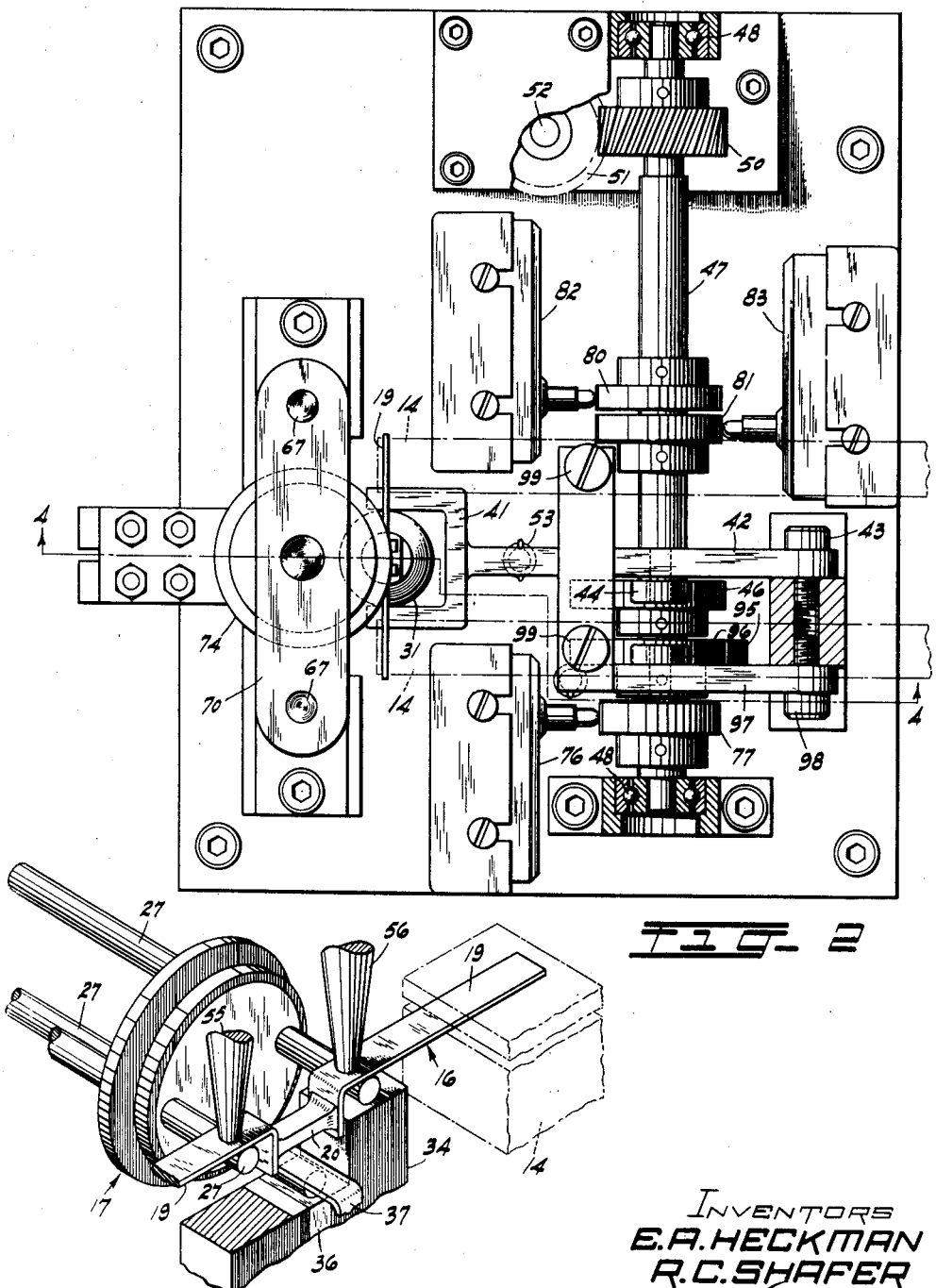

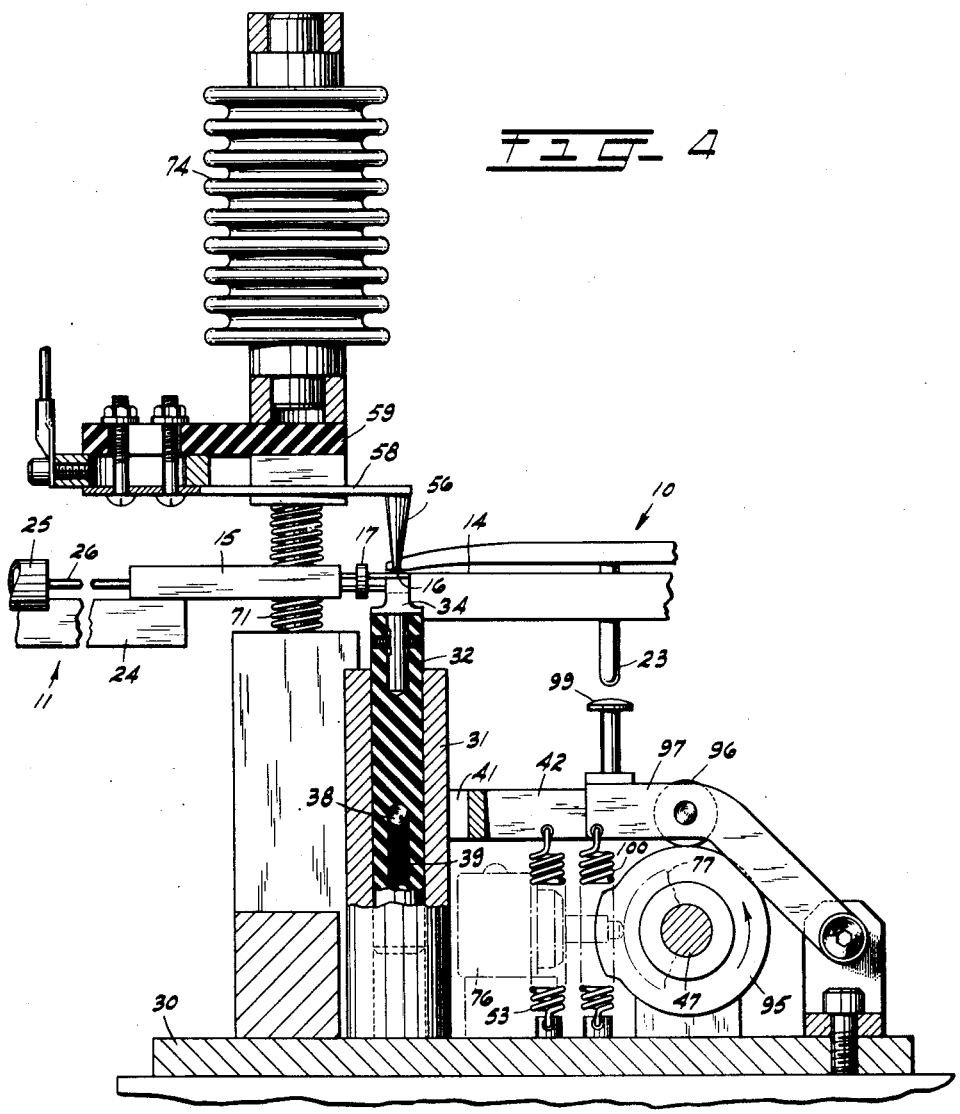

United States Patent Office 2,951,932
Patented Sept. 6, 1960

2,951,932

WELDING APPARATUS

Edward A. Heckman, Allentown, and Richard C. Shafer, Emmaus, Pa., assignors to Western Electric Company, Incorporated, New York, N.Y., a corporation of New York Filed July 21, 1958, Ser. No. 749,984

3 Claims. (Cl. 219—78)

This invention relates to article assembling apparatus particularly apparatus for completing articles by joining sub-assemblies thereof.

In the manufacture of certain types of articles, groups of parts of the articles are formed in sub-assemblies and, when these sub-assemblies are joined together, the articles are completed. One example of machines of this type is a transistor assembling machine composed mainly of two machines of the turret type having holders for various parts moved intermittently relative to processing units for the successive forming of the sub-assemblies and finally moving the sub-assemblies into a final assembling position where the sub-assemblies are brought together and joined to complete the transistor.

An object of the present invention is an apparatus interposed between two sub-assembly forming machines to efficiently joint sub-assemblies of these machines into completed articles.

In accordance with the object, the apparatus, employed in combination with two machines for forming their respective sub-assemblies of articles disposed adjacent each other and having holders for their sub-assemblies movable successively into a final assembling position where metallic parts of the sub-assemblies are to be secured together, includes a lower electrode movable to engage a metallic part of one of the sub-assemblies, an upper electrode adapted to engage a metallic part of the other sub-assembly, and means to complete a circuit for an electrical current through the electrodes and the metallic parts to join them together.

More specifically, the apparatus includes two lower electrodes under the control of a cam on a cam shaft adapted to raise the electrodes to engage and support two leads of one sub-assembly. Two upper electrodes are movable under predetermined pressure into engagement with metallic parts of the other sub-assembly to force the metallic parts respectively against their leads. Cams of the cam shaft operate switches to complete circuits including separate upper and lower electrodes therein to join the metallic parts of one sub-assembly to the leads of the other.

Other objects and advantages will be apparent from the following detailed description when considered in conjunction with the accompanying drawings, wherein:

Fig. 2 is a top plan view of the apparatus, portions thereof being broken away;

Fig. 3 is an enlarged fragmentary isometric view of the sub-assemblies and the electrodes, and Fig. 4 is a vertical sectional view taken along the line 4—4 of Fig. 2 showing the apparatus mounted at the juncture of two sub-assembly machines.

Figure 1:
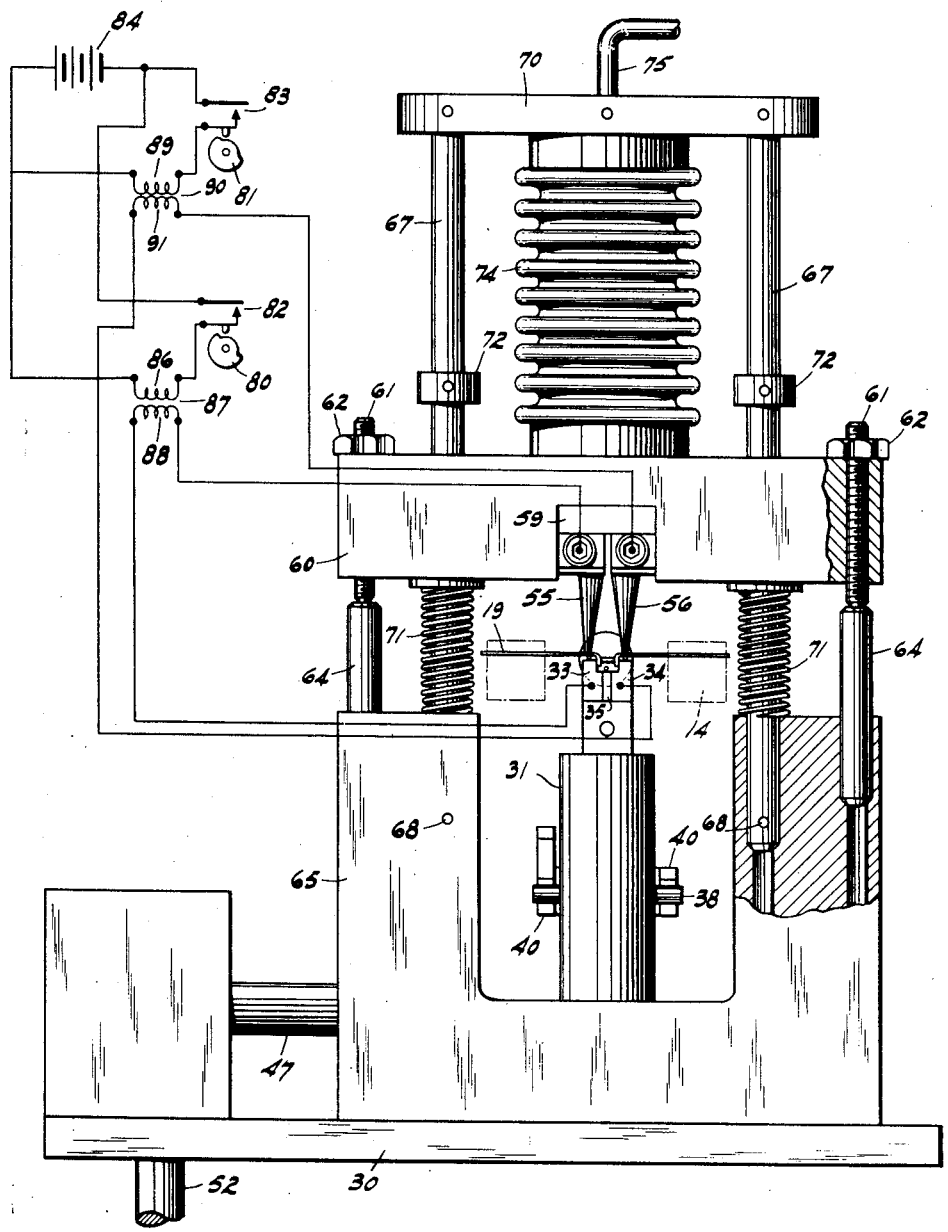
Fig. 1 is a front elevational view of the apparatus, this view also showing a schematic wiring diagram of the circuits for the electrodes.

The apparatus is mounted at a final assembling position which is the juncture between the sub-assembly processing machines indicated generally at 10 and 11, Fig. 4, where holders 14 and 15 and sub-assemblies 16 and 17, Fig. 3, are to be joined. The machines 10 and 11 are disclosed in a co-pending application of R. C. Shafer, Serial No. 745,388, filed June 30, 1958. At the final assembling position the sub-assembly 16 includes the metallic ribbon portions 19 with the processed transistor bar 20 mounted therebetween. The ribbon portions 19 are supported in the holders 14 which are pairs of gripping jaws mounted radially on a turret-type structure moved intermittently relative to processing units. The upper jaws of the holders 14 have plungers 23 which extend downwardly through apertures in the lower jaws, the plungers being employed to open the jaws of the holders when it is desirable to free the sub-assembly 16.

The holders 15 for the assemblies 17 are held inwardly, normally, toward the axis of the turret-type member 24 and are conditioned to slide longitudinally into and out of the final assembling position shown in Fig. 4 under the control of air cylinders 25, each connected through its piston rod 26 to its holder 15. Action of the air cylinder 25 in each instance is delayed until both holders 14 and 15 come to rest in the final assembling position, at which time the air cylinder of the holder 15 in this position will be operated to move the holder 15 to move the parallel leads 27, of the sub-assembly 17, beneath the ribbon portions 19 of the sub-assembly 16.

The apparatus for completing the final assembly of the sub-assemblies 16 and 17 includes a base plate 30 mounted below the final assembling position and having a vertical support 31 mounted thereon and made hollow to receive a reciprocable member 32, formed preferably of a dielectric material. Lower electrodes 33 and 34 insulated from each other at 35 are mounted upon the member 32 and have cut-away portions to allow room between the upper portions of the lower electrodes for a base lead 36 of the sub-assembly 17 and its metallic ribbon 37. The member 32 is normally supported by a pin 38, which extends through an elongate aperture 39 in the sides of the member 31, and also through an aperture in the member 32. The ends of the pin 38 are positioned in bifurcated ends 40 of a yoke-type portion 41 of a cam lever 42. The cam lever 42 is pivotally supported at 43 and carries a cam roller or follower 44 positioned to ride upon a cam 46 which is fixedly mounted upon a cam shaft 47.

The cam shaft 47 has its ends journaled in bearings 48 and a gear 50 mounted thereon and in engagement with a gear 51 of a drive shaft 52. The drive shaft 52 is driven during the intervals of rest of the turret-type portions of the sub-assembly machines to cause one revolution of the cam shaft during each period of rest of these machines. A spring 53 causes a cam follower 42 to follow its cam, serving also to return the member 32 with the lower electrodes 33—34 to the starting or down positions.

Upper electrodes 55 and 56 are positioned to engage the ribbon portions 19 to cooperate respectively with their lower electrodes 33 and 34 to secure the ribbon portions to the leads 27. The upper electrodes are insulated from each other and supported by flexible members 58 attached separately to a dielectric member 59, this member being secured to a lateral member 60. The lateral member 60 carries adjustable stops 61, in the form of screws disposed in threaded apertures of the member 60 and held in adjusted positions by nuts 62. The adjustable stops are aligned with fixed stops, in the form of rods 64, mounted in a vertical support 65 as shown in Fig. 1. The vertical support 65 is mounted upon the base plate 30. Parallel rods 67 have their lower ends fixedly mounted at 68 in apertures of the vertical member 65 and have their upper ends secured to a lateral member 70. The rods 67 extend through apertures in the member 60 and springs 71, the springs resting upon the upper surface of the vertical member 65 and forcing against the member 60 to urge it into its starting or upper position against collars 72 mounted at selected positions on the rod 67. A bellows or corrugated type air cylinder 74 is interposed between the members 60 and 70 with its respective ends secured thereto. A fluid line 75, having one end communicating with the air cylinder 74, extends to a solenoid valve, not shown, which is under the control of a switch 76, Fig. 2. Switch 76 is actuated by a cam 77 on the cam shaft 47 to cause air under pressure to enter the cylinder 74, after the sub-assemblies have been moved into the final assembling position, to force the member 60 downwardly against the springs 71 to move the upper electrodes 55 and 56 into engagement with the ribbon portions 19 of sub-assembly 16.

The electrodes are formed in pairs 33—55 and 34—56 and included in this manner in circuits which may be defined as heating circuits to accomplish the joining of the ribbon portions 19 to their leads 27 either by welding or soldering. If the parts are to be soldered, one or both parts in each instance may be coated suitably with solder to complete the joining of the sub-assemblies through the energization of electrodes in their heating circuits. If the parts are to be welded together, then suitable welding currents may be directed through the pairs of electrodes. As an illustration, cams 80 and 81 mounted upon the cam shaft 49 are formed to closed switches 82 and 83 respectively, to complete heating circuits (for welding or soldering) for their respective pairs of electrodes 33—35 and 34—56. In the present instance the battery 84 represents the initial source of electrical energy. When switch 82 is closed by cam 80, a circuit is completed through a primary winding 86 of a transformer 87. A circuit for the secondary winding 88 includes the electrodes 33—55. When switch 83 is closed by cam 81, a circuit is completed through a primary winding 89 of a transformer 90, a secondary winding 91 being in a circuit including electrodes 34—56.

*Operation*

During each interval of rest, after the machines move their completed sub-assemblies 16 and 17 into the final assembling position, the sub-assembly 16 remaining gripped by the holders 14 and the sub-assembly 17 being moved to locate the leads 27 beneath and closely adjacent the ribbon portions 19, the apparatus is operated to complete the assembly of the article. This is brought about by the single cycle of the cam shaft 47, to rotate its cams simultaneously but to cause them to function in a given order, first to move the lower electrodes upwardly through actuation of the cam lever 42 with its cam 46 to position the lower electrodes 33—34 into engagement with their respective leads 27.

Following this action, the upper electrodes are moved downwardly through operation of the air cylinder 74, which is responsive to cam 77 and switch 76. The air cylinder forces the upper electrodes downwardly under predetermined pressure to accomplish satisfactory electrical connection between each upper electrode, the ribbon portions 19, their leads 27 and the lower electrode, so that the metallic parts o fthe sub-assemblies will be joined by soldering or welding. These connections are completed through the closing of the switches 82 and 83 responsive to their cams 80 and 81. After sufficient time has elapsed to complete the joining of the sub-assemblies through the application of suitable heat through the pairs of electrodes, the upper electrodes are moved to their starting positions by exhaustnig air from the air cylinder 74 (releasing of switch 76, by cam 77, to open) and the lower electrodes are returned to their starting positions under the control of the cam 46. At this time, and prior to the completion of the period of rest of the turrets of the two machines, a cam 95 on the cam shaft 47 causes its follower 96, which is supported by a cam lever 97, to rock the cam lever about its pivot 98 to move projections 99, supported by a lateral extending portion of the cam lever, to engage the plungers 23 of the upper jaws of holders 14 to open the upper jaws. This action frees the completed article from connection with one machine so that when the holder 15 of the other machine is returned to its starting position by its air cylinder 25, the completed article goes with it. The turret type portions of the two machines may continue their intermittent motions moving the completed articles to an ejecting position and bringing two new sub-assemblies to the final assembling position. A spring 100 normally urges the cam lever 97 to follow its cam 95.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with two machines, for forming their respective sub-assemblies of articles, disposed adjacent each other and having holders for their sub-assemblies movable intermittently successively into a final assembling position where metallic parts of the sub-assemblies are to be secured together during intervals of rest between the intermittent movements of the holders, of electrodes positioned normally out of paths of the sub-assemblies, means operable to move the electrodes into engagement with their respective metallic parts of the sub-assemblies at the final assembling position, a normally open circuit for a heating current of electrical energy including the electrodes, means actuable automatically when the electrodes engage their parts to close the circuit for a predetermined length of time to thereby join the sub-assemblies into an article, and means operable to open one of the holders for its sub-assembly prior to the next intermittent movement so that the article will be moved out of the final assembling position by the other holder.

2. The combination with two machines, for forming their respective sub-assemblies of articles, disposed adjacent each other and having holders for their sub-assemblies movable intermittently successively into a final assembling position where metallic parts of the sub-assemblies are to be secured together during intervals of rest between the intermittent movements of the holders, of electrodes positioned normally out of paths of the sub-assemblies, a power drive operated through a single cycle during each interval of rest of the holders, means driven by the power drive to move the electrodes into, and hold them in, engagement with their respective metallic parts of the sub-assemblies at the final assembling poistion during a predetermined length of time, a normally open circuit for a heating current of electrical energy including the electrodes, means operated by the power drive during a predetermined interval of tis cycle to close the circuit to thereby join the sub-assemblies into an article, and means actuated by the power drive to open one of the holders for its sub-assembly at the final assembling position after the completion of the article, by joining the sub-assemblies, so that the article will be moved out of the final assembling position by the other holder.

3. The combination with two machines, for forming their respective sub-assemblies of articles, disposed adjacent each other and having holders for their sub-assemblies movable intermittently successively into a final assembling position where metallic parts of the sub-assemblies are to be secured together during intervals of rest between the intermittent movements of the holders, of electrodes positioned normally out of paths of the sub-assemblies, a cam shaft driven through complete single cycles during the intervals of rest of the holders, separate means operable to move the electrodes into engagement with their respective metallic parts of the sub-assemblies at the final forming position, a normally open circuit for a heating current of electrical energy including the electrodes, means operable to close the circuit to cause the heating current to join the sub-assemblies into an article, cams mounted on the cam shaft and formed to cause operation of said operable means in a predetermined order, means operable to open one of the holders for its sub-assembly at the final assembling position after the completion of the article, by joining the sub-assemblies, so that the article will be moved out of the final assembling position by the other holder, and another cam mounted on the cam shaft and formed to cause operation of the last-mentioned operable means subsequent to the operation of the aforementioned operable means.

References Cited in the file of this patent

UNITED STATES PATENTS

| | | |
|---|---|---|
| 2,129,845 | King et al. | Sept. 13, 1938 |
| 2,388,754 | Martindell | Nov. 13, 1945 |
| 2,616,015 | Glasener et al. | Oct. 28, 1952 |
| 2,906,855 | Long | Sept. 29, 1959 |